April 21, 1925.
W. HASLAM
1,534,383
DISK WHEEL FOR VEHICLES
Filed April 10, 1924
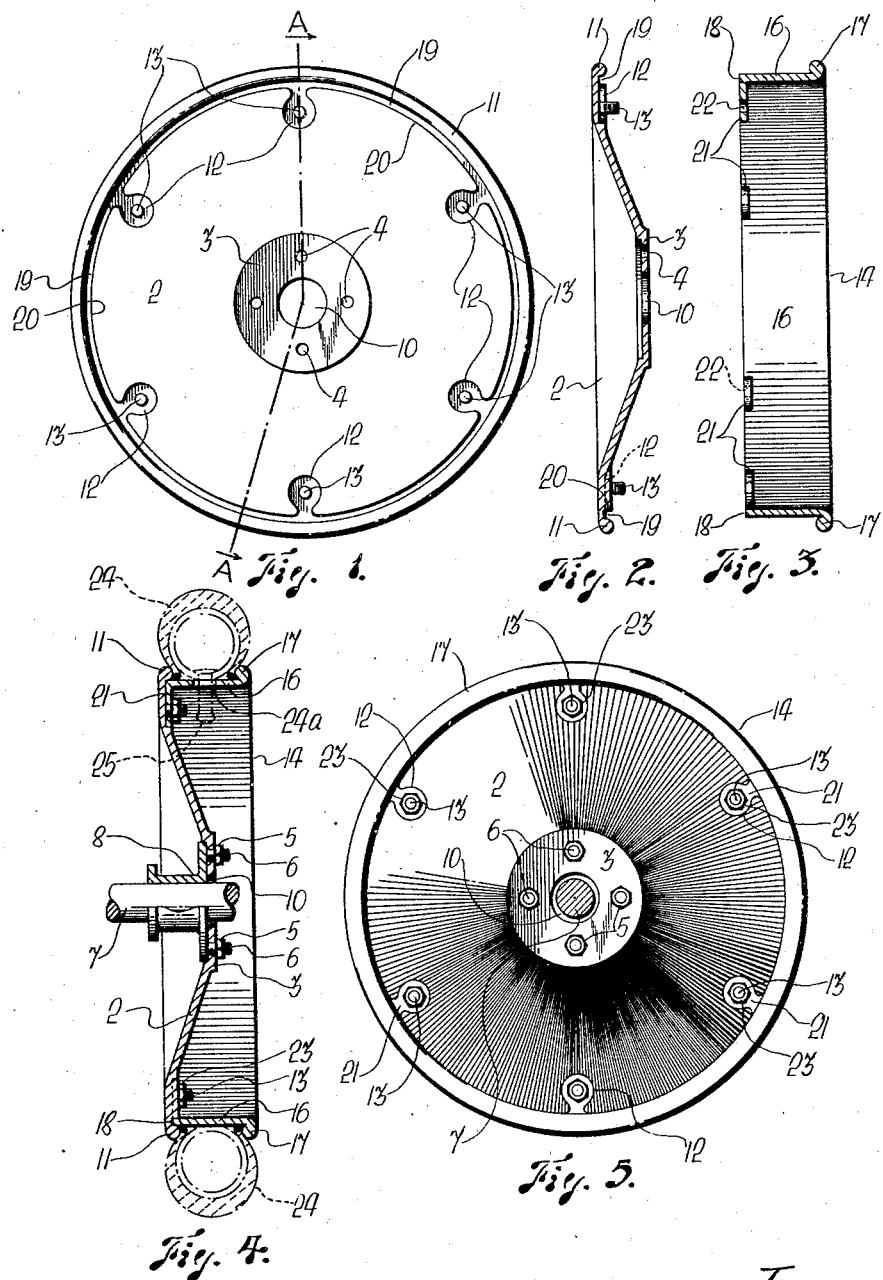

Patented Apr. 21, 1925.

1,534,383

UNITED STATES PATENT OFFICE.

WILLIAM HASLAM, OF SOUTH MELBOURNE, AUSTRALIA, ASSIGNOR OF ONE-HALF TO WILHELM ALFRED DAMSCHKE, OF SOUTH MELBOURNE, AUSTRALIA.

DISK WHEEL FOR VEHICLES.

Application filed April 10, 1924. Serial No. 705,612.

*To all whom it may concern:*

Be it known that I, WILLIAM HASLAM, a subject of the King of Great Britain and Ireland, and a resident of the postal district of Albert Park, in the city of South Melbourne, county of Bourke, State of Victoria, Commonwealth of Australia, have invented certain new and useful Improved Disk Wheels for Vehicles, of which the following is a specification.

This invention relates to vehicle wheels and has particular reference to detachable disk wheels for automobiles.

Detachable disk wheels as at present constructed usually comprise a disk member adapted to be detachably mounted on the wheel axle, and a beaded tire carrying rim which is fixed on the periphery of the disk member. Although such disk wheels may be readily applied to and detached from their axles, the removal and replacement of the tires is a difficult task involving the use of tire levers or the like to force the tire over the beaded edges or lip of the rim and frequently incurring damage to the tire cover or tube.

The primary object of the present invention is to provide an improved detachable disk wheel which is entirely exempt from the disadvantages in tire changing operations experienced with existing wheels of the disk type and whereby the tire may be speedily placed upon and removed from the wheel with a minimum of labor and without the use of tire levers or like tools.

With this object in view the improved wheel comprises two essential parts, namely a disk or body member which may be detachably mounted on the wheel axle in conventional manner, and a separate tire carrying rim or seating ring which is removably attached to said disk or body member, the latter being adapted to assist in retaining the tire in position when the wheel is assembled for use. The tire carrying rim is of such a construction that the tire may be readily placed thereon and removed therefrom by hand; and when it is attached to the wheel disk or body, it co-operates therewith to retain the tire in position.

Referring to the drawings which form part of this specification:—

Figure 1 is a side elevation of the disk or body member of a wheel in accordance with the invention.

Figure 2 is a cross section of the disk or body member taken on line A—A of Figure 1.

Figure 3 is a cross sectional view of the detachable tire carrying rim of the improved wheel.

Figure 4 is a cross section showing the complete wheel applied to the axle of a vehicle, the plane of section being the same as that of the sections shown in Figures 2 and 3. In broken lines a pneumatic tire is indicated in position on the wheel.

Figure 5 is an elevation of the assemblage seen in Figure 4, looking at the outer side of the wheel. The tire is omitted.

In the drawings, 2 indicates the metal disk or body member of the wheel which may be provided with a flat faced central or hub portion 3 having holes 4 formed therethrough to pass retaining bolts or studs 6 which may outstand from a collar or hub plate 8 fixed on the wheel axle 7. The latter may pass through a central passage 10 formed through the hub portion 3 of the disk 2 which is detachably secured to the axle by nuts 5 on the studs 6.

The disk or body member 2 is preferably dished outwardly from a point near its outer periphery towards the hub portion 3 so that the latter is located approximately centrally between the inner and outer edges of the assembled wheel, as in Figure 4, and the weight of the vehicle is thus carried centrally by the wheel to evenly distribute the strain.

The disk or body member 2 is provided at its outer peripheral edge with an inner lip or tire retaining bead 11. Pockets or recesses 12 are also formed in the disk 2 adjacent the lip or bead 11, and studs or bolts 13 outstand horizontally from the disk member, preferably within the pockets or recesses 12, in order that the tire carrying rim hereinafter described may be detachably secured to the disk.

The outer face of the disk member 2 is provided at a slight distance inwardly from the lip or bead 11 with a circumferential shoulder 20, forming between said shoulder and the bead 11 an annular groove or channel 19.

The tire carrying rim comprises a tire seating portion 16 of flat cross section which is provided at one side with a projecting lip or bead 17 so shaped as to constitute the outer peripheral tire retaining lip of the wheel. The opposite or inner side edge 18 of the said flat tire seating portion 16 is plain or unobstructed as shown and fits within the annular groove or channel 19 in the outer face of the disk member 2, as seen at the lower part of Figure 4.

Projecting radially inwards from the inner circumferential edge 18 of the tire carrying rim are lugs 21 which are adapted to fit closely into the aforesaid pockets or recesses 12 in the disk or body member 2, the thickness of the lugs corresponding to the depth of said pockets or recesses. The lugs 21 have apertures 22 formed therethrough to pass the aforementioned bolts or studs 13 which outstand from the face of the disk or body member.

By means of nuts 23 engaging said studs or bolts 13, the tire carrying rim 14 is detachably retained to the disk or body of the wheel, the inner circumferential edge 18 and the radially projecting lugs 21 being tightly pressed into the annular groove or channel 19 and the pockets or recesses 12 respectively. The result is that radial strains are taken by the shoulder 20 of the disk bearing on the edge portion 18 of the tire carrying rim whilst circumferential strains tending to separate the disk and rim members are taken by the lugs 21 engaging in the pockets 12.

It will be seen from the foregoing that when the disk and rim members 2 and 14 are bolted together as in Figure 4, the tire 24, which has been previously placed on the tire carrying rim, is firmly gripped between the aforesaid tire retaining lips or beads 11 and 17. In this respect it is regarded as important that owing to the engagement of the inner circumferential edge 18 of the rim 14 with the annular channel 19 in the disk member 2, the possibility of the tire 24 being pinched between said edge 18 and the tire retaining lip 11 is entirely avoided. The usual valve 25 for inflating the tire may pass freely through a suitable opening 24ᵃ in the portion 16 of the tire carrying rim, as indicated in Figure 4.

To remove a tire from the improved wheel, it is merely necessary to detach the tire carrying rim 14 with the tire thereon from the wheel body or disk 2 by withdrawing the nuts 23 from the studs 13. The tire may then be easily removed over the plain inner edge 18 of the rim without the exertion and delay occasioned in levering or forcing the tire over the retaining lips or beads of existing disk wheels. The tire may be similarly replaced by passing it over the inner edge 18 of the tire carrying rim, after which the latter with the tire thereon is bolted to the disk 2.

It will be evident also that a spare rim member 14 with a new or serviceable tire thereon may be instantly substituted for a rim carrying a deflated or defective tire when it is not desired to incur the delay of tire repairing operations. In this regard the cost of a spare tire carrying rim 14 in accordance with the invention would obviously be considerably less than that of a complete spare wheel which has hitherto been necessary under such conditions.

The complete wheel may be bodily detached from its axle upon withdrawal of the nuts 5 on the retaining bolts 6 carried by the hub member or collar 8 as aforesaid.

Having now described my invention what I claim as new and desire to secure by Letters Patent is:—

1. A disk wheel for vehicles comprising in combination a disk or body member provided with an integral tire retaining lip or bead around its outer periphery and having pockets or recesses formed in its outer face adjacent said lip or bead, a tire carrying rim provided at its outer side edge with a tire retaining lip or bead formed integrally with a tire seating portion of substantially flat cross section which is adapted to extend laterally between said lips or beads of the disk and the tire carrying rim when the parts of the wheel are assembled, the inner side edge of said rim being plain or unobstructed to permit of free passage of the tire thereover, integral lugs projecting radially inwards from said tire carrying rim at its inner side edge, said lugs corresponding to and being accommodated by said pockets or recesses in the outer side face of said disk, and means for detachably fastening said tire carrying rim to said disk.

2. A disk wheel for vehicles comprising a disk or body member provided with an integral tire retaining lip or bead extending around its outer periphery, a circumferential groove or channel formed in the outer side face of said disk adjacent to and concentric with said lip or bead, and pockets or recesses also formed in said outer side face of the disk adjoining said groove or channel, a tire carrying rim comprising a tire seating portion of substantially flat cross section having an integral tire retaining lip or bead extending around its outer side edge and a plain or unobstructed inner side edge adapted to fit into said circumferential groove or channel of the disk and to freely pass the inner circumference of the tire, lugs projecting radially inwards from said tire carrying rim at its inner side, said lugs being adapted to fit into said pockets or recesses of the disk, and means for detachably securing said tire carrying rim to said disk, for the purpose set forth.

3. A disk wheel for vehicles comprising a disk or body member provided with an integral tire retaining bead or lip extending around its outer periphery, a circumferential groove or channel formed in the outer face of said disk immediately adjoining and concentric with said lip or bead, and pockets or recesses formed in said outer side face of the disk and opening into said groove or channel, a tire carrying rim comprising a tire seating portion of substantially flat cross section having an integral tire retaining lip or bead extending around its outer side edge and having a plain or unobstructed inner side edge adapted to freely fit into said circumferential groove or channel in the disk and to freely pass the inner circumference of the tire, lugs projecting radially inwards from said tire carrying rim at its inner side edge, said lugs being adapted to fit into said pockets or recesses of the disk, and studs outstanding from said disk within the pockets or recesses thereof, said studs passing through coinciding holes in said radial lugs of the tire carrying rim.

4. A disk wheel for vehicles comprising a disk or body member provided with an integral tire retaining bead or lip extending around its outer periphery at the inner side of the wheel and pockets or recesses formed in the outer side face of said disk adjacent said lip or bead thereof, a tire carrying rim having an integral tire retaining lip or bead extending around its outer side edge and a plain or unobstructed inner side edge adapted to freely pass the inner circumference of the tire, lugs projecting radially inwards from said tire carrying rim at its inner side, said lugs being adapted to engage within said pockets or recesses of the disk, and studs outstanding from said disk within the pockets or recesses thereof and passing through coinciding holes in said radial lugs of the tire carrying rim, whereby the latter is detachably secured to the disk, said disk being dished outwardly from a point adjacent said pockets or recesses towards the wheel axle and having a flat hub portion located substantially centrally between said tire retaining lips or beads of the disk and the tire carrying rim, said hub portion of the disk being provided with holes to accommodate bolts or studs for securing the disk to the wheel axle.

In testimony whereof I affix my signature.

WILLIAM HASLAM.